United States Patent [19]
Tsutsumi

[11] Patent Number: 5,159,493
[45] Date of Patent: Oct. 27, 1992

[54] RETROFOCUS TYPE WIDE ANGLE LENS COMPRISING A FIXED GROUP AND MOVABLE CORRECTIVE AND REAR GROUPS

[75] Inventor: Katsuhisa Tsutsumi, Omiya, Japan

[73] Assignee: Fuji Photo Optical Co., Ltd., Omiya, Japan

[21] Appl. No.: 739,435

[22] Filed: Aug. 2, 1991

[30] Foreign Application Priority Data

Aug. 4, 1990 [JP] Japan .................... 2-205956

[51] Int. Cl.⁵ ............................. G02B 15/14
[52] U.S. Cl. ...................... 359/680; 359/749; 359/689
[58] Field of Search ............ 359/680, 681, 682, 749, 359/750, 751, 752, 753, 689, 690, 740, 642

[56] References Cited

U.S. PATENT DOCUMENTS

| | | | |
|---|---|---|---|
| 4,266,860 | 5/1981 | Hayashi | 359/681 |
| 4,303,311 | 12/1981 | Nakamura | 359/689 |
| 4,838,666 | 6/1989 | Shiraishi | 359/689 |
| 5,000,550 | 3/1991 | Takahashi et al. | 359/680 |

FOREIGN PATENT DOCUMENTS 1079716 3/1989 Japan .................... 359/689

Primary Examiner—Janice A. Howell
Assistant Examiner—James Beyer
Attorney, Agent, or Firm—Oblon, Spivak, McClelland, Maier & Neustadt

[57] ABSTRACT

Described herein is a retrofocus type wide angle lens system composed of a front group with a negative power and a rear group with a positive power, in which the front group is divided into a fixed group starting with a negative meniscus lens having a convex surface on the object side and terminating with a negative lens element having a concave surface on the image-forming side, and a corrective group starting with a positive lens element having a convex surface on the object side. The fixed group which is constituted by larger and heavier lens elements is held stationary relative to an image forming plane, while the corrective group of smaller and light-weight lens elements is movable in the direction of the optical axis concurrently with the rear group to vary the width of the air space between the respective groups at the time of focusing, thereby effectively correcting various aberrations which would otherwise occur in a conspicuous degree in infinite to near distance focusing.

7 Claims, 9 Drawing Sheets

SPHERICAL ABERRATION

FIELD CURVATURE

DISTORTION

SPHERICAL ABERRATION

FIELD CURVATURE

DISTORTION

SPHERICAL ABERRATION

FIELD CURVATURE

DISTORTION

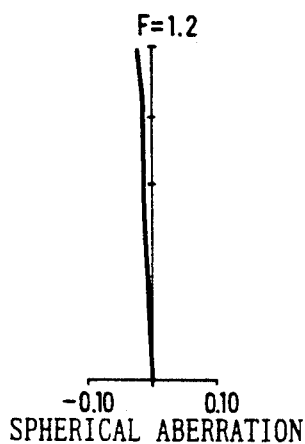
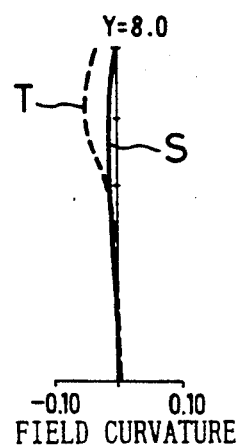
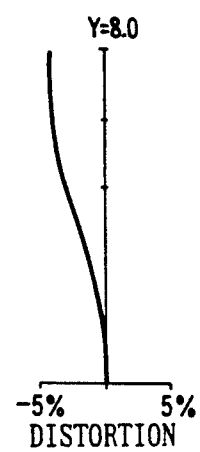
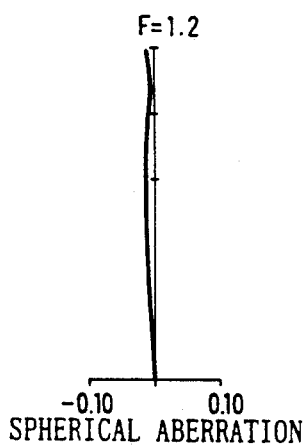
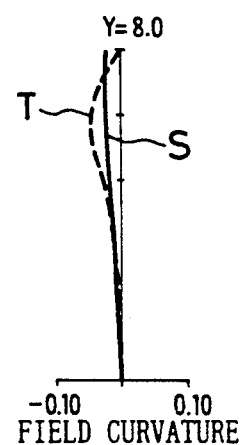
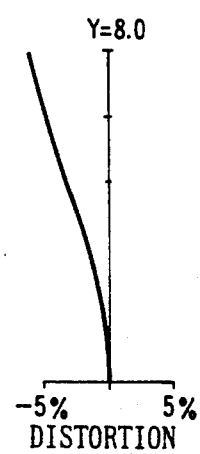
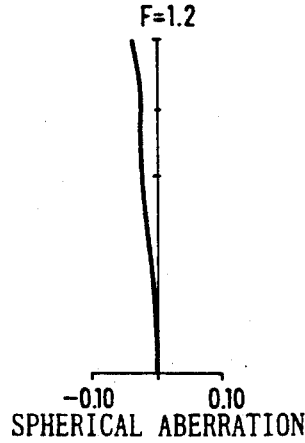
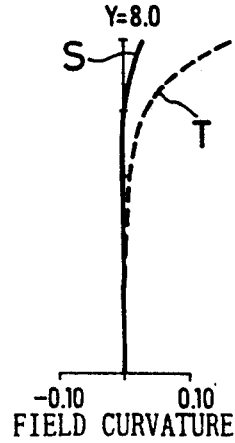
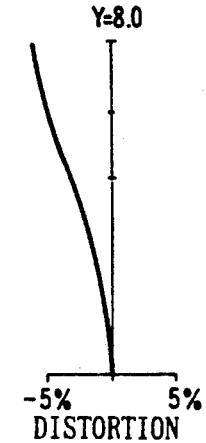

F=1.4
-0.10　0.10
SPHERICAL ABERRATION

Y=5.5
T, S
-0.10　0.10
FIELD CURVATURE

Y=5.5
-5%　5%
DISTORTION

F=1.4
-0.10　0.10
SPHERICAL ABERRATION

Y=5.5
S, T
-0.10　0.10
FIELD CURVATURE

Y=5.5
-5%　5%
DISTORTION

F=1.4
-0.10　0.10
SPHERICAL ABERRATION

Y=5.5
S, T
-0.10　0.10
FIELD CURVATURE

Y=5.5
-5%　5%
DISTORTION

RETROFOCUS TYPE WIDE ANGLE LENS COMPRISING A FIXED GROUP AND MOVABLE CORRECTIVE AND REAR GROUPS

BACKGROUND OF THE INVENTION

1. Field of the Art

This invention relates to a wide angle lens for television cameras, and more particularly to a retrofocus type wide angle lens which is capable of making corrections to minimize variations in aberrations especially in field curvature and astigmatism which take place when focusing to an object at a close distance.

2. Description of the Prior Art

To meet a demand for a back focal length which is several times longer than the focal length, television camera lenses generally employ a retrofocus type lens system which is composed of a front group of lens elements with a negative refractive power and a rear group with a positive power. In focusing, it is the general practice with a retrofocus type lens of this sort to shift the position of the whole lens system forward or in a direction away from the image-forming plane. In this connection, there has also been known in the art to correct the field curvature, which varies in a marked degree especially in near distance focusing, by shifting the position of the negative front group rearward or toward the image-forming plane while sifting the whole lens system forward.

In the former case where the whole lens system is shifted forward at the time of focusing, it is necessary to correct aberrations on the basis of a reference object point located between infinite distance and close distances, in view of the lens characteristics of the asymmetric arrangement combining a negative front group with a positive rear group. Therefore, aberrations are suitably corrected at the reference object distance, but except the object point at the reference distance it is difficult to obtain images of good quality due to variations in aberrations especially in field curvature, which occur in a conspicuously magnified degree in infinite to near distance focusing. For example, if the whole lens system is shifted forward, various aberrations occur even in case of an optical system in one of the embodiments of the invention, as seen in the comparative examples shown in FIGS. 5, 9, 13 and 17 which will be discussed hereinlater.

On the other hand, in the latter case where the front group is shifted backward while shifting the whole lens system forward, it is possible to correct the field curvature which varies to a considerable degree in focusing to an object at the nearest distance. However, since this system is a wide angle lens with an extremely short focal length as compared with the back focal length, the negative refractive power of the front group becomes too strong to correct aberrations such as field curvature and astigmatism. That is to say, for correction of these aberrations, there have to be incorporated a larger number of lens elements of a larger diameter, which will result in equipments of heavy weight and awkward to handle in focusing operations, in addition to a problem that the correction of aberrations in near distance focusing is still unsatisfactory.

SUMMARY OF THE INVENTION

The present invention contemplates to eliminate the above-mentioned problems or drawbacks of the prior art, and has as its object the provision of a retrofocus type wide angle lens which can correct variations of aberrations in infinite to near distance focusing.

It is another object of the present invention to provide a retrofocus type wide angle lens which can correct aberrations securely over the entire focusing range from infinite to near distance to permit ultra-wide angle shooting of high performance quality.

In accordance with the present invention, the above-stated objectives are achieved by the provision of a retrofocus type wide angle lens system which is composed of a negative front group $G_{1,2}$ and a positive rear group $G_3$, characterized in that: the front group $G_{1,2}$ is constituted by a fixed group $G_1$ starting with a negative meniscus lens having a convex surface on the object side and terminating with a negative lens element having a concave surface on the imaging side, and a corrective group $G_2$ starting with a positive lens element having a convex surface on the object side, the fixed group $G_1$ being fixed relative to an image-forming plane while the corrective group $G_2$ and the rear group $G_3$ being movable concurrently in the direction of the optical axis to vary the width of the air space between the respective groups for focusing purposes.

BRIEF DESCRIPTION OF THE DRAWINGS

The above and other objects, features and advantages of the invention will become apparent from the following description and the appended claims, taken in conjunction with the accompanying drawings which show some preferred embodiments of the invention and in which:

FIGS. 7(a) to 7(c) are diagrams of aberrations at the time of infinite distance focusing in the second embodiment of the invention;

FIGS. 8(a) to 8(c) are diagrams of aberrations at the time of near distance focusing in the second embodiment of the invention;

FIGS. 9(a) to 9(c) are diagrams of aberrations in near distance focusing, as observed when the whole lens system of the second embodiment is shifted forward;

DESCRIPTION OF PREFERRED EMBODIMENTS

Figure 1:
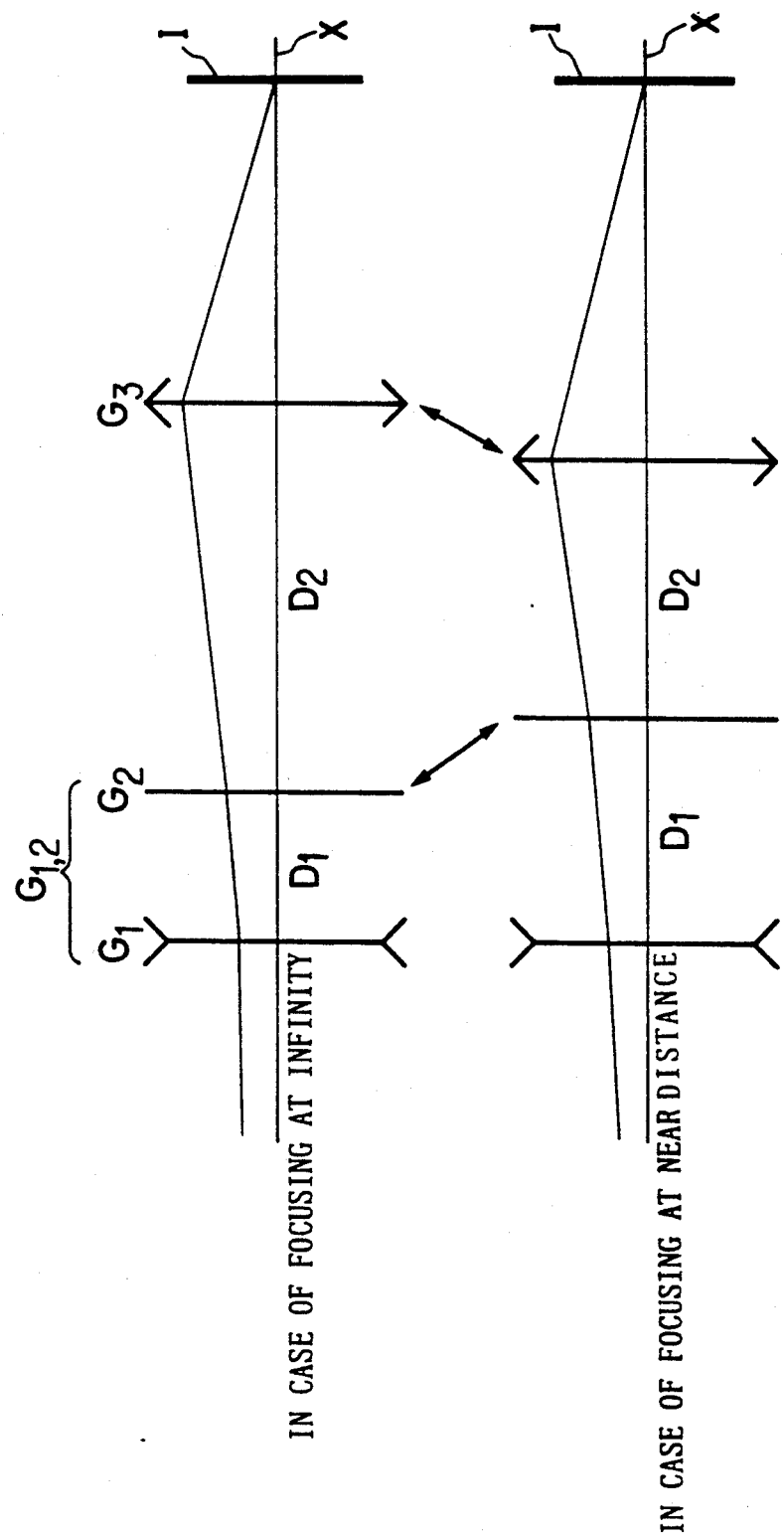
FIG. 1 is a diagrammatic illustration of a retrofocus type wide angle lens according to the invention, showing shifted lens positions in focusing.

Hereafter, the invention is described in greater detail by way of the preferred embodiments shown in the drawings.

FIG. 1 schematically shows the construction of a lens system according to the invention along with its shifted mode, in which indicated at $G_{1,2}$ is a front group with a negative combined focal length, at $G_3$ is a rear group with a positive combined focal length, at X is an optical axis and at I is an image-forming plane. In this instance, the front group $G_{1,2}$ is divided into a first subgroup consisting of lens elements which are larger in outer diameter and weight and a second subgroup consisting of lens elements which are relatively small in outer diameter and weight. The larger and heavier subgroup on the object side serves as a fixed group $G_1$, and the smaller and light-weight subgroup on the image-forming side serves as a corrective group $G_2$ which is movable in the direction of the optical axis X.

This lens system brings images of objects to focus basically by shifting the position of the rear group $G_3$ forward or rearward along the optical axis X. In case of focusing in the direction of from infinite to near distance, the rear group $G_3$ is shifted toward the object (forward) and similarly the corrective group $G_2$ is shifted toward the imaging side (rearward) to narrow the air space $D_2$ between the rear group $G_3$ and the corrective group $G_2$. On the contrary, in case of focusing in the direction of from near distance to infinite, the rear group $G_3$ is shifted rearward and concurrently the corrective group $G_2$ is shifted forward to widen the air space $D_2$ between the rear group $G_3$ and the corrective group $G_2$.

At the time of focusing, the fixed group $G_1$ of the front group $G_{1,2}$ is held stationary. The fixation of the larger and heavier group $G_1$ contributes to avoid deteriorations in maneuverability of the lens system in focusing. Various aberrations which occur in infinite to near distance focusing can be effectively corrected by shifting only the corrective group $G_2$ of the front group $G_{1,2}$ in this manner. The shifts of the corrective group $G_2$ and the rear group $G_3$ may be of either linear or non-linear mode, of which the non-linear mode is preferred from the standpoint of correction of aberrations.

The fixed subgroup $G_1$ of the front group $G_{1,2}$ is arranged to terminate with a lens element of a negative refractive power having a concave surface on the side of the image-forming plane and the corrective group $G_2$ of the front group $G_{1,2}$ is arranged to start with a lens element of a positive refractive power having a convex surface on the side of the object, the air space $D_1$ which is formed between the fixed group $G_1$ and the corrective group $G_2$ functioning as an air lens which can be used advantageously for correction of aberrations.

More specifically, the above-described lens system is preferred to be arranged to satisfy the conditions of $$-0.18 \leq \phi_2/\phi_{1,2} \leq 0.45 \quad (1)$$

$$0.5 \leq R_2/R_1 \leq 1.2 \quad (2)$$

where $\phi_{1,2}$ is the overall refractive power of the composite front group $G_{1,2}$ of the lens system, namely, of the fixed group $G_1$ plus the corrective group $G_2$, $\phi_2$ is the refractive power of the corrective group $G_2$, and $R_1$ and $R_2$ are the radii of curvature of the final surface of the fixed group $G_1$ of the front group $G_{1,2}$ and the initial surface of the corrective group $G_2$ of the lens system.

The condition (1) defines the distribution of power to the fixed group $G_1$ and the corrective group $G_2$ which constitute the front group $G_{1,2}$. If the value is smaller than the lower limit of the condition (1), it becomes difficult to correct variations in lateral chromatic aberration resulting from focusing to a different object distance. On the other hand, if greater than the upper limit of the condition (1), difficulties are encountered not only in correcting lateral chromatic aberration which varies with the field angle at a given object distance, but also in correcting coma which varies to a greater degree with variations in object distance in focusing.

The condition (2) defines the shape of the air gap between the fixed group $G_1$ and the corrective group $G_2$. If the value is smaller than the lower limit of the condition (2), there arises a problem that variation in coma becomes greater when focusing to a different object distance, coupled with a difficulty of machining and polishing the concave meniscus lens elements in the front group to shape. If greater than the upper limit of the condition (2), coma flare will become too large to secure satisfactory performance quality.

The retrofocus type wide angle lens of the invention is illustrated more particularly by the following description of preferred embodiments, in which various notations are used to stand for the meanings as follows:

m: The surface number counted sequentially from the object side;
ri: The radius of curvature of a lens component of number i counted from the object side;
di: The width of air space or thickness of a lens component of number i counted from the object side;
$n_{ei}$: The index of refraction, with respect to line e, of a lens component of number i counted from the object side;
$\nu_{ei}$: The abbe number of a lens component of number i counted from the object side;
f: Focal length;
Bf: Back focal length;
F: Effective f number; and
Object distance: The distance from the apex of the front lens group of the lens system to an object.

EMBODIMENT 1

Figure 2:
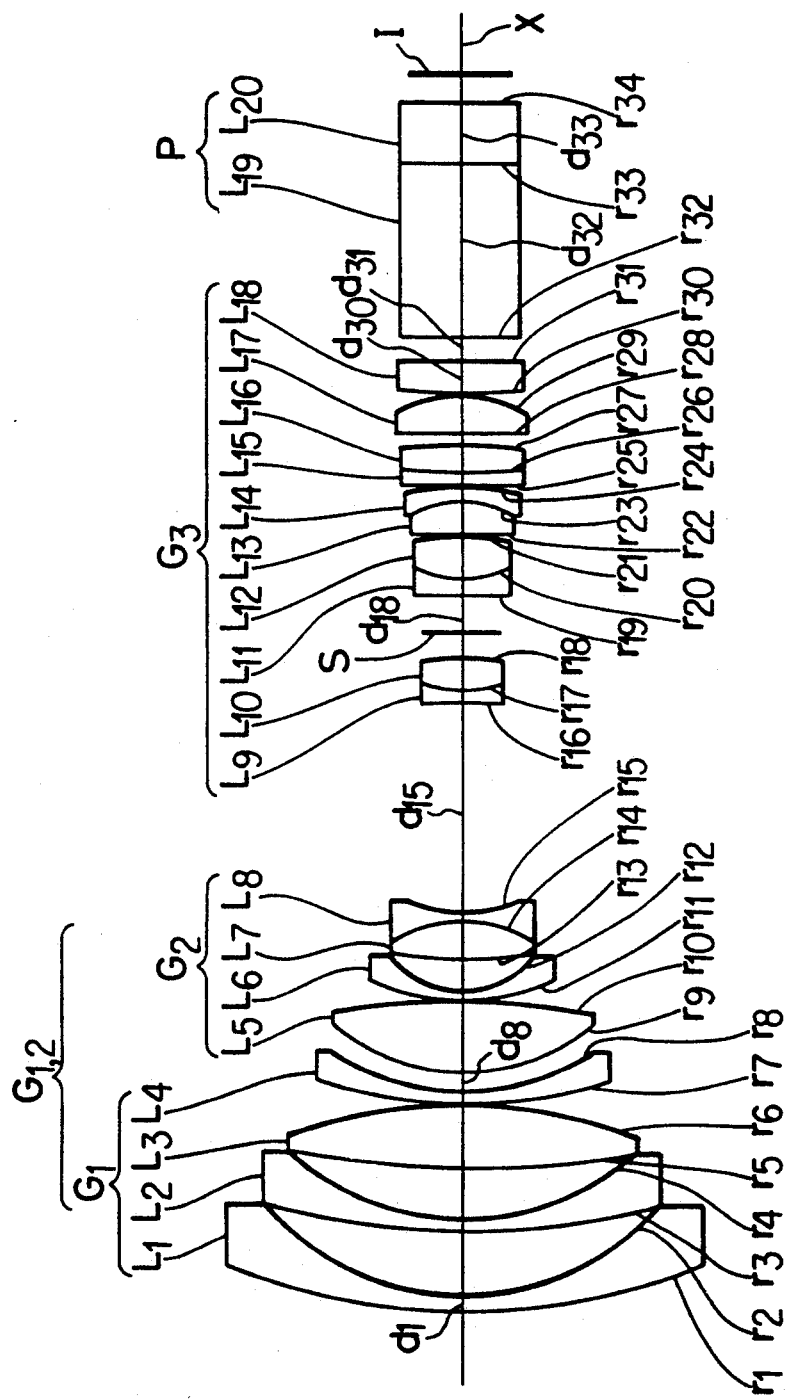
FIG. 2 is a schematic illustration of the lens construction in a first embodiment of the invention.

The lens construction of the Embodiment 1 is shown in FIG. 2.

As clear therefrom, the fixed group $G_1$ in the front group $G_{1,2}$ of the lens system is constituted, when viewed from the object side, by a negative meniscus lens $L_1$ having a convex surface disposed on the object side, a negative meniscus lens $L_2$ having a convex surface disposed on the object side, a biconvex lens $L_3$, and a negative meniscus lens $L_4$ having a convex surface disposed on the object side. The corrective group $G_2$ is constituted by a biconvex lens $L_5$ having a strong convex surface disposed on the object side, a negative meniscus lens $L_6$ having a convex surface disposed on the object side, and a cemented lens $L_{7+8}$ composed of a biconvex lens $L_7$ and a biconcave lens $L_8$. The rear group $G_3$ is constituted by a cemented lens $L_{9+10}$ composed of a biconcave lens $L_9$ and a biconvex lens $L_{10}$, a cemented lens $L_{11+12}$ composed of a negative meniscus lens $L_{11}$ having a convex surface disposed on the object and a biconvex lens $L_{12}$, a cemented lens $L_{13+14}$ composed of a positive meniscus lens $L_{13}$ having a concave surface disposed on the object side and a negative meniscus lens $L_{14}$ having a concave surface disposed on the object side, a cemented lens $L_{15+16}$ composed of a biconcave lens $L_{15}$ and a biconvex lens $L_{16}$, a positive meniscus lens $L_{17}$ having a concave surface disposed on the object side, and a biconvex lens $L_{18}$. The lens elements $L_{19}$ and $L_{20}$ are employed as a prism P, and an aperture stop S is interposed between the lens elements $L_{10}$ and $L_{11}$.

The numeric particulars of this lens construction are given below.

| m | r | d | $n_e$ | $v_d$ |
|---|---|---|---|---|
| 1 | 113.016 | 3.5 | 1.77620 | 49.6 |
| 2 | 52.644 | 12.4 | | |
| 3 | 133.747 | 3.0 | 1.82017 | 46.6 |
| 4 | 52.779 | 11.4 | | |
| 5 | 265.171 | 12.2 | 1.48914 | 70.4 |
| 6 | −103.514 | 0.3 | | |
| 7 | 93.894 | 2.2 | 1.85026 | 41.7 |
| 8 | 48.944 | Variable | | |
| 9 | 38.601 | 14.7 | 1.57561 | 44.7 |
| 10 | −147.656 | 0.2 | | |
| 11 | 46.154 | 2.0 | 1.88814 | 40.8 |
| 12 | 18.034 | 6.8 | | |
| 13 | 85.695 | 6.7 | 1.85501 | 23.9 |
| 14 | −28.235 | 2.0 | 1.82548 | 45.3 |
| 15 | 27.853 | Variable | | |
| 16 | −88.664 | 2.0 | 1.73233 | 54.7 |
| 17 | 17.089 | 6.3 | 1.72310 | 29.5 |
| 18 | −85.172 | 12.5 | | |
| 19 | 538.373 | 3.5 | 1.88814 | 40.8 |
| 20 | 22.730 | 8.7 | 1.51976 | 52.4 |
| 21 | −39.609 | 0.3 | | |
| 22 | −388.202 | 6.8 | 1.49845 | 81.6 |
| 23 | −19.124 | 2.5 | 1.85649 | 32.3 |
| 24 | −43.720 | 0.3 | | |
| 25 | −2222.300 | 2.5 | 1.85649 | 32.3 |
| 26 | 91.358 | 5.8 | 1.49845 | 81.6 |
| 27 | −64.337 | 2.2 | | |
| 28 | −194.823 | 7.1 | 1.48915 | 70.2 |
| 29 | −29.043 | 0.3 | | |
| 30 | 70.108 | 7.1 | 1.71615 | 53.9 |
| 31 | −257.887 | 2.0 | | |
| 32 | ∞ | 33.0 | 1.58566 | 46.4 |
| 33 | ∞ | 13.2 | 1.51872 | 64.0 |
| 34 | ∞ | 7.2 | | |

Focal length f = 5.0 mm
Field angle = 95.5°
F = 1.8

| Object distance | ∞ | 270 mm |
|---|---|---|
| $d_8$ | 2.16 | 6.29 |
| $d_{15}$ | 43.56 | 38.79 |
| Bf | 38.65 | 39.29 |

$\phi_2/\phi_{1.2} = 0.31$
$R_2/R_1 = 0.79$

Figure 3A:
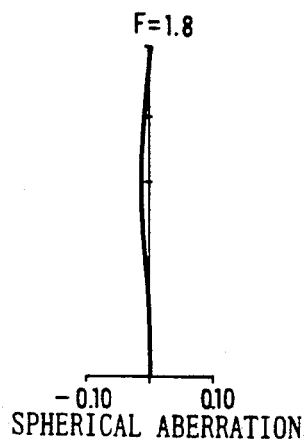
FIGS. 3(a) to 3(c) are diagrams of aberrations at the time of infinite distance focusing in the first embodiment of the invention.
Figure 3B:
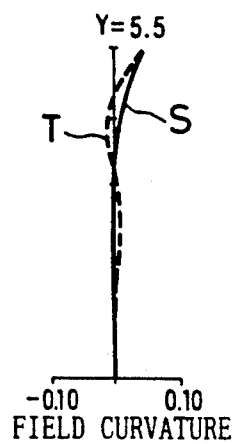
Figure 3C:
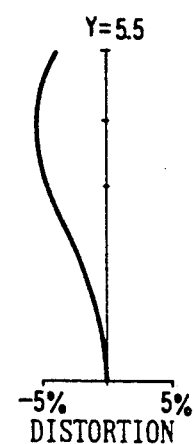
Figure 4A:
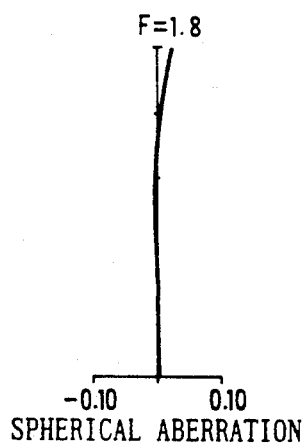
FIGS. 4(a) to 4(c) are diagrams of aberrations at the time of near distance focusing in the first embodiment of the invention.
Figure 4B:
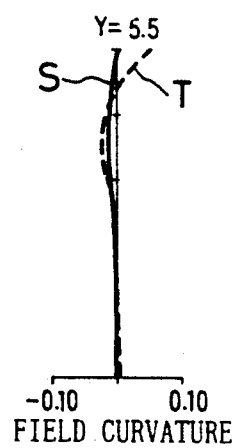
Figure 4C:
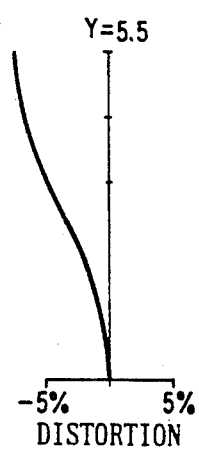
Figure 5A:
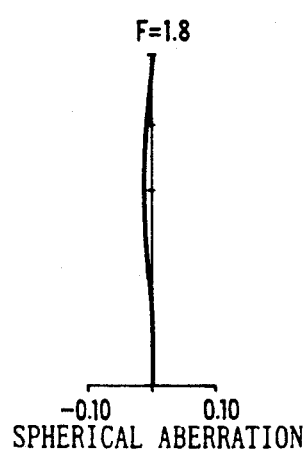
FIGS. 5(a) to 5(c) are diagrams of aberrations in near distance focusing, as observed when the whole lens system of the first embodiment is shifted forward.
Figure 5B:
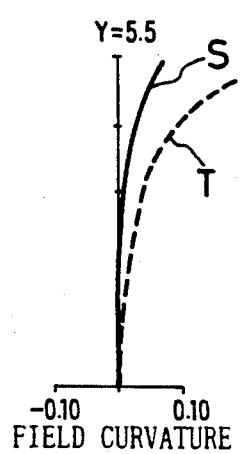
Figure 5C:
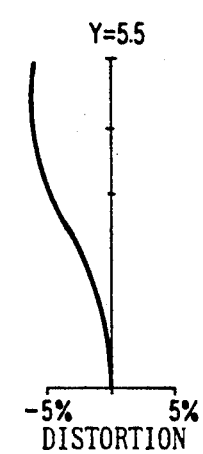

The aberration curves of this lens construction are shown in FIGS. 3 and 4 where the object distance is ∞ and 270 mm, respectively. FIG. 5 shows, for the purpose of comparison, similar aberration curves at the object distance of 270 mm, as observed when the whole lens system of the same construction as in the Embodiment 1 is shifted forward for focusing.

EMBODIMENT 2

Figure 6:
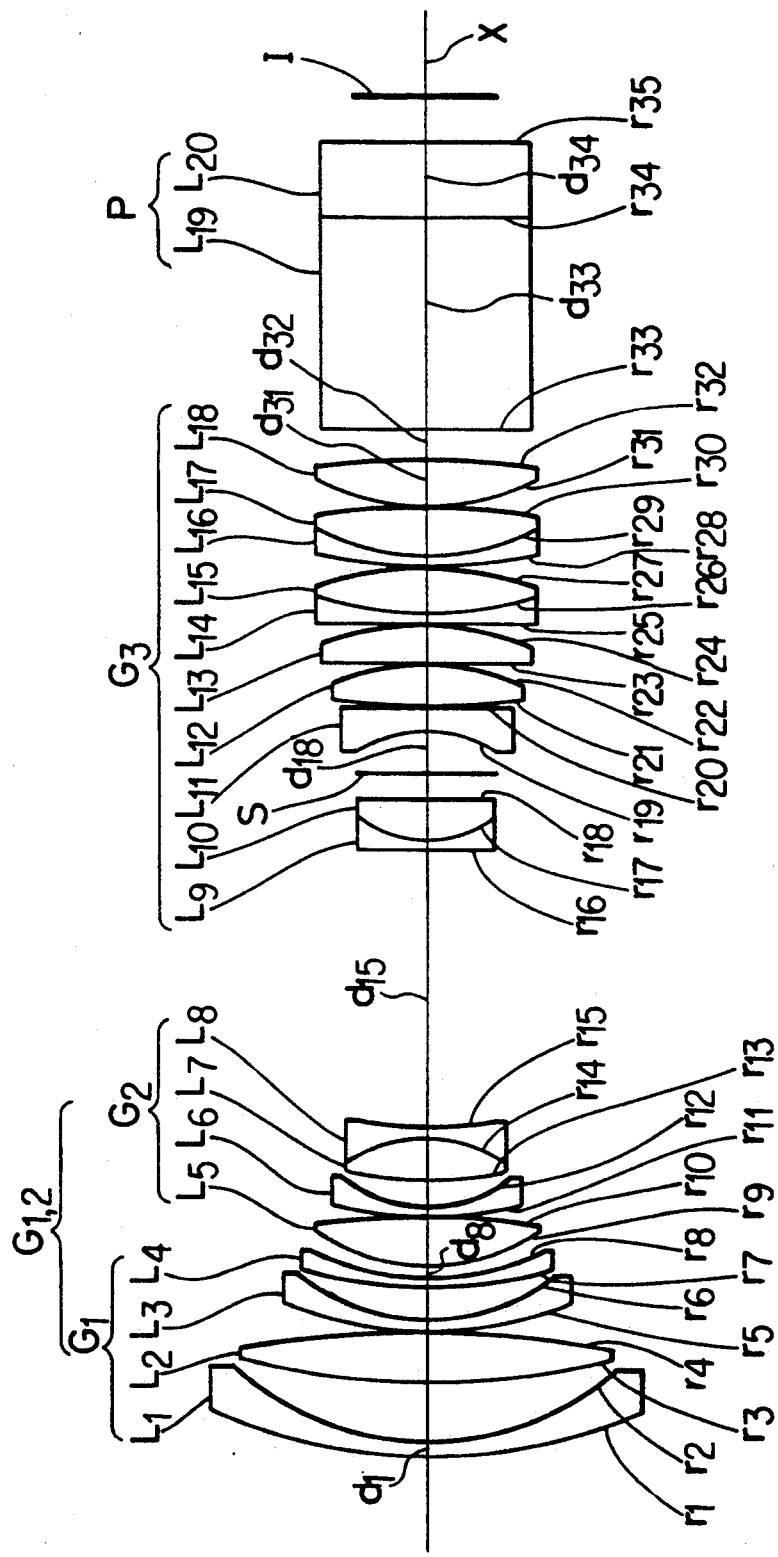
FIG. 6 is a schematic illustration of the lens construction in a second embodiment of the invention.

The lens construction of the Embodiment 2 is shown in FIG. 6.

As clear therefrom, the fixed group $G_1$ in the front group $G_{1,2}$ of the lens system is constituted, when viewed from the object side, by a negative meniscus lens $L_1$ having a convex surface disposed on the object side, a biconvex lens $L_2$, a negative meniscus lens $L_3$ having a convex surface disposed on the object side, and a negative meniscus lens $L_4$ having a convex surface disposed on the object side. The corrective group $G_2$ is constituted by a biconvex lens $L_5$ having a strong convex surface disposed on the object side, a negative meniscus lens $L_6$ having a convex surface disposed on the object side, and a cemented lens $L_{7+8}$ composed of a biconvex lens $L_7$ and a biconcave lens $L_8$. The rear group $G_3$ is constituted by a cemented lens $L_{9+10}$ composed of a biconcave lens $L_9$ and a biconvex lens $L_{10}$, a negative meniscus lens $L_{11}$ having a concave surface disposed on the object, a biconvex lens $L_{12}$, a positive meniscus lens $L_{13}$ having a concave surface disposed on the object side, a cemented lens $L_{14+15}$ composed of a negative meniscus lens $L_{14}$ having a convex surface disposed on the object side and a biconvex lens $L_{15}$, a cemented lens $L_{16+17}$ composed of a negative meniscus lens $L_{16}$ having a convex surface disposed on the object side and a biconvex lens $L_{17}$, and a biconvex lens $L_{18}$. The lens elements $L_{19}$ and $L_{20}$ are employed as a prism P, and an aperture stop S is interposed between the lens elements $L_{10}$ and $L_{11}$.

The numeric particulars of this lens construction are given below.

| m | r | d | $n_e$ | $v_d$ |
|---|---|---|---|---|
| 1 | 139.909 | 3.5 | 1.77620 | 49.6 |
| 2 | 67.342 | 14.5 | | |
| 3 | 195.911 | 12.2 | 1.51825 | 64.1 |
| 4 | −315.719 | 0.2 | | |
| 5 | 92.159 | 2.4 | 1.88814 | 40.8 |
| 6 | 43.992 | 8.7 | | |
| 7 | 101.956 | 2.3 | 1.82548 | 45.3 |
| 8 | 61.819 | Variable | | |
| 9 | 45.618 | 12.0 | 1.63509 | 35.8 |
| 10 | −314.075 | 0.3 | | |
| 11 | 83.874 | 2.1 | 1.88814 | 40.8 |
| 12 | 29.637 | 6.5 | | |
| 13 | 104.710 | 10.5 | 1.81264 | 25.4 |
| 14 | −36.407 | 2.1 | 1.88814 | 40.8 |
| 15 | 63.906 | Variable | | |
| 16 | −1305.900 | 2.0 | 1.72309 | 49.1 |
| 17 | 26.669 | 11.0 | 1.72310 | 29.5 |
| 18 | −244.808 | 15.6 | | |
| 19 | −34.922 | 5.7 | 1.88814 | 40.8 |
| 20 | −934.482 | 0.8 | | |
| 21 | 461.757 | 9.5 | 1.49845 | 81.6 |
| 22 | −46.269 | 0.2 | | |
| 23 | −820.558 | 8.8 | 1.49845 | 81.6 |
| 24 | −67.528 | 0.2 | | |
| 25 | 7538.900 | 2.2 | 1.85649 | 32.3 |
| 26 | 88.227 | 11.0 | 1.48915 | 70.2 |
| 27 | −88.224 | 0.2 | | |
| 28 | 114.166 | 2.3 | 1.85649 | 32.3 |
| 29 | 56.804 | 11.8 | 1.48915 | 70.2 |
| 30 | −145.041 | 0.2 | | |
| 31 | 62.986 | 10.7 | 1.71615 | 53.9 |
| 32 | −518.147 | 2.0 | | |
| 33 | ∞ | 50.5 | 1.69979 | 55.4 |
| 34 | ∞ | 18.5 | 1.51872 | 64.0 |
| 35 | ∞ | 16.0 | | |

Focal length f = 9.7 mm

-continued

| Field angle = 80.2° | | |
| --- | --- | --- |
| F = 1.2 | | |
| Object distance | ∞ | 450 mm |
| $d_8$ | 3.26 | 7.16 |
| $d_{15}$ | 66.80 | 62.28 |
| Bf | 59.91 | 60.53 |
| $\phi_2/\phi_{1.2} = 0.20$ | | |
| $R_2/R_1 = 0.74$ | | |

The aberration curves of this lens construction are shown in FIGS. 7 and 8 where the object distance is ∞ and 450 mm, respectively. For the purpose of comparison, FIG. 9 shows similar aberration curves at the object distance of 450 mm, as observed when the whole lens system of the same construction as in the Embodiment 2 is shifted forward for focusing.

EMBODIMENTS 3

Figure 10:
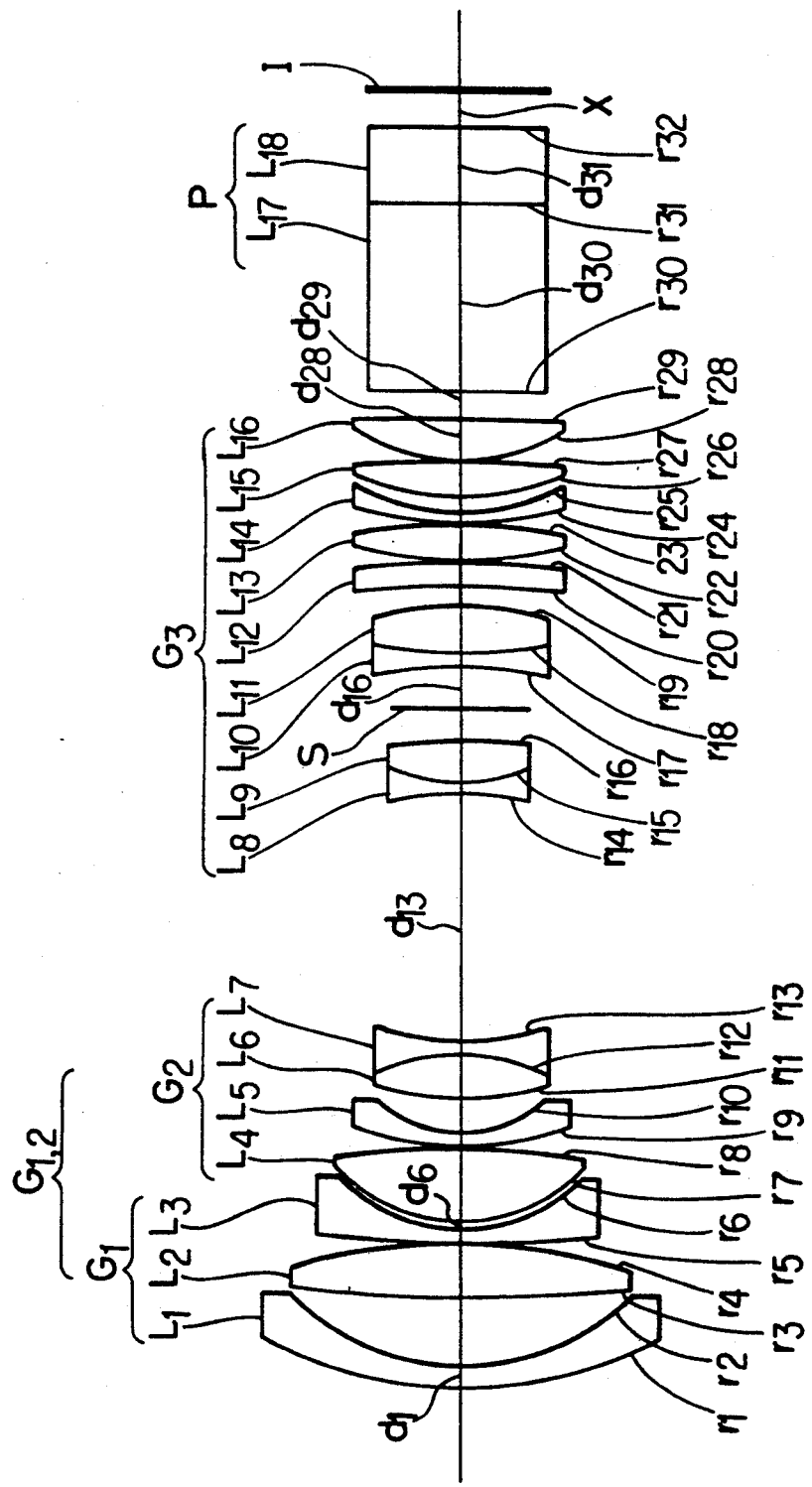
FIG. 10 is schematic illustration of the lens construction in a third embodiment of the invention.

The lens construction of the Embodiment 3 is shown in FIG. 10.

As clear therefrom, the fixed group $G_1$ in the front group $G_{1,2}$ of the lens system is constituted, when viewed from the object side, by a negative meniscus lens $L_1$ having a convex surface disposed on the object side, a biconvex lens $L_2$, and a negative meniscus lens $L_3$ having a convex surface disposed on the object side. The corrective group $G_2$ is constituted by a biconvex lens $L_4$, a negative meniscus lens $L_5$ having a convex surface disposed on the object side, and a cemented lens $L_{6+7}$ composed of a biconvex lens $L_6$ and a biconcave lens $L_7$. The rear group $G_3$ is constituted by a cemented lens $L_{8+9}$ composed of a biconcave lens $L_8$ and a biconvex lens $L_9$, a cemented lens $L_{10+11}$ composed of a biconcave lens $L_{10}$ and a biconvex lens $L_{11}$, a positive meniscus lens $L_{12}$ having a concave surface disposed on the object, a biconvex lens $L_{13}$, a negative meniscus lens $L_{14}$ having a convex surface disposed on the object side, a biconvex lens $L_{15}$, and a biconvex lens $L_{16}$. The lens elements $L_{17}$ and $L_{18}$ are employed as a prism P, and an aperture stop S is interposed between the lens elements $L_9$ and $L_{10}$.

The numeric particulars of this lens construction are given below.

| m | r | d | $n_e$ | $v_d$ |
| --- | --- | --- | --- | --- |
| 1 | 75.464 | 3.5 | 1.77620 | 49.6 |
| 2 | 37.173 | 13.5 | | |
| 3 | 653.666 | 9.0 | 1.48915 | 70.2 |
| 4 | −83.737 | 0.2 | | |
| 5 | 262.929 | 2.4 | 1.82548 | 45.3 |
| 6 | 28.146 | Variable | | |
| 7 | 28.216 | 13.5 | 1.60718 | 38.0 |
| 8 | −104.871 | 0.3 | | |
| 9 | 41.680 | 2.1 | 1.88814 | 40.8 |
| 10 | 21.541 | 6.5 | | |
| 11 | 43.716 | 7.5 | 1.81264 | 25.4 |
| 12 | −38.832 | 2.1 | 1.88814 | 40.8 |
| 13 | 27.365 | Variable | | |
| 14 | −66.789 | 2.0 | 1.72309 | 49.1 |
| 15 | 28.470 | 7.0 | 1.72310 | 29.5 |
| 16 | −88.466 | 13.2 | | |
| 17 | −85.462 | 2.5 | 1.81264 | 25.4 |
| 18 | 74.530 | 0.8 | 1.53430 | 48.9 |
| 19 | −53.143 | 3.7 | | |
| 20 | −129.855 | 4.0 | 1.48915 | 70.2 |
| 21 | −98.779 | 0.2 | | |
| 22 | −75.538 | 6.5 | 1.49845 | 81.6 |
| 23 | −83.118 | 0.2 | | |
| 24 | 71.723 | 2.0 | 1.85649 | 32.3 |
| 25 | 41.188 | 2.3 | | |
| 26 | 53.646 | 6.0 | 1.49845 | 81.6 |
| 27 | −124.513 | 0.2 | | |
| 28 | 35.588 | 7.0 | 1.49845 | 81.6 |
| 29 | −2530.300 | 2.0 | | |
| 30 | ∞ | 33.0 | 1.58566 | 46.4 |
| 31 | ∞ | 13.2 | 1.51872 | 64.0 |
| 32 | ∞ | 8.3 | | |

| Focal length f = 8.0 mm | | |
| --- | --- | --- |
| Field angle = 69.0° | | |
| F = 1.4 | | |
| Object distance | ∞ | 240 mm |
| $d_6$ | 1.04 | 1.36 |
| $d_{13}$ | 43.17 | 42.57 |
| Bf | 39.78 | 40.06 |
| $\phi_2/\phi_{1.2} = -0.124$ | | |
| $R_2/R_1 = 1.002$ | | |

Figure 11A:
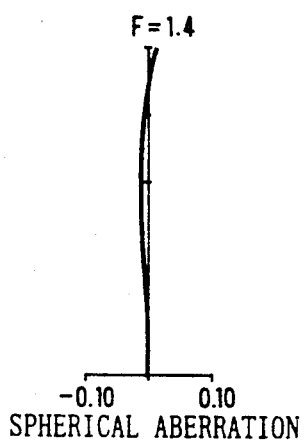
FIGS. 11(a) to 11(c) are diagrams of aberrations at the time of infinite distance focusing by the third embodiment of the invention.
Figure 11B:
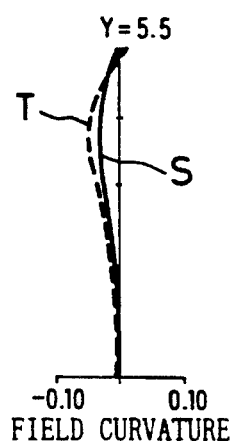
Figure 11C:
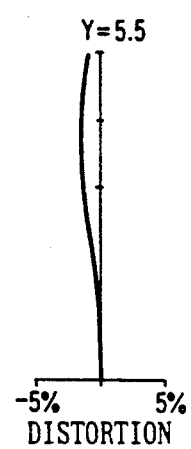
Figure 12A:
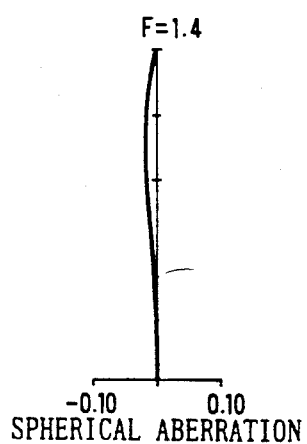
FIGS. 12(a) to 12(c) are diagrams of aberrations at the time of near distance focusing by the third embodiment of the invention.
Figure 12B:
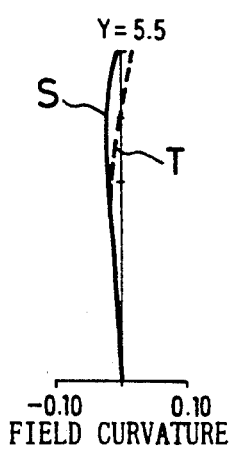
Figure 12C:
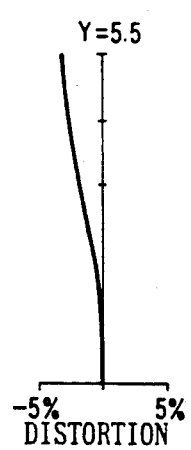
Figure 13A:
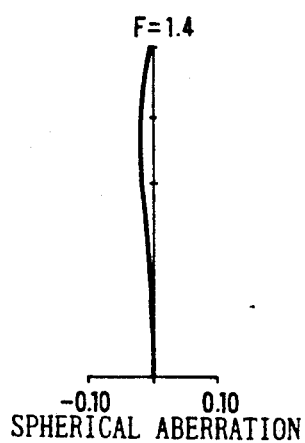
FIGS. 13(a) to 13(c) are diagrams of aberrations in near distance focusing, as observed when the whole lens system of the third embodiment is shifted forward.
Figure 13B:
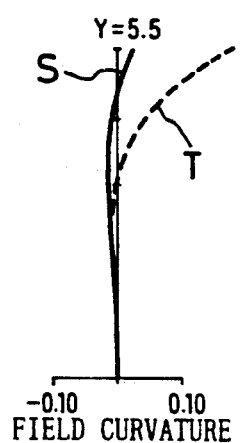
Figure 13C:
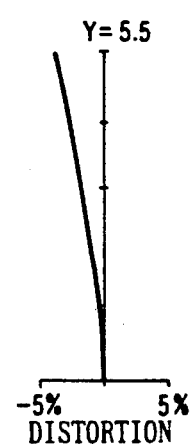

The aberration curves of this lens construction are shown in FIGS. 11 and 12 where the object distance is ∞ and 240 mm, respectively. For the purpose of comparison, FIG. 13 shows similar aberration curves at the object distance of 240 mm, as observed when the whole lens system of the same construction as in the Embodiment 3 is shifted forward for focusing.

EMBODIMENT 4

Figure 14:
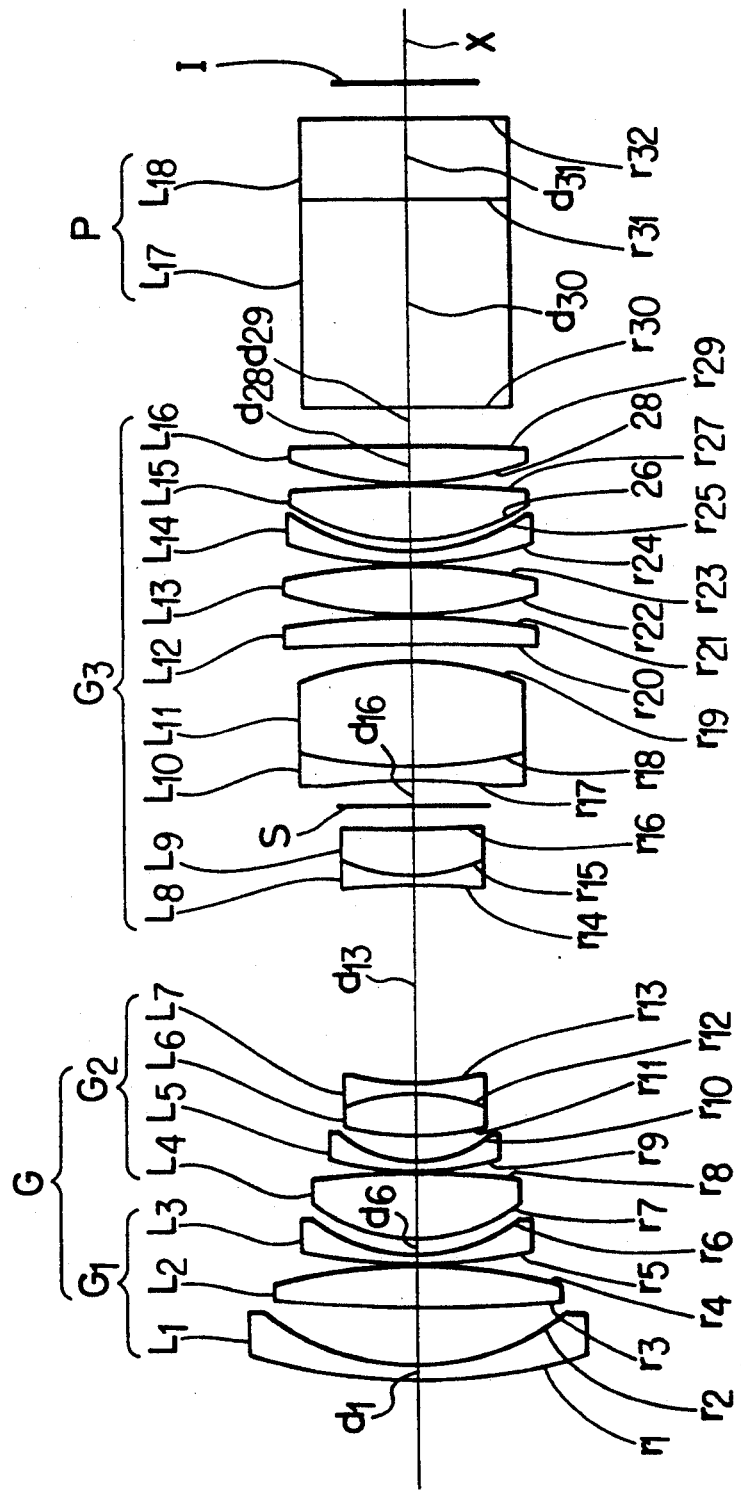
FIG. 14 is a schematic illustration of the lens construction in a fourth embodiment of the invention.

The lens construction of the Embodiment 3 is shown in FIG. 14.

As clear therefrom, the fixed group $G_1$ in the front group $G_{1,2}$ of the lens system is constituted, when viewed from the object side, by a negative meniscus lens $L_1$ having a convex surface disposed on the object side, a biconvex lens $L_2$, and a negative meniscus lens $L_3$ having a convex surface disposed on the object side. The corrective group $G_2$ is constituted by a biconvex lens $L_4$ having a strong convex surface on the object side, a negative meniscus lens $L_5$ having a convex surface disposed on the object side, and a cemented lens $L_{6+7}$ composed of a biconvex lens $L_6$ and a biconcave lens $L_7$. The rear group $G_3$ is constituted by a cemented lens $L_{8+9}$ composed of a biconcave lens $L_8$ and a positive meniscus lens $L_9$ having a convex surface disposed on the object side, a cemented lens $L_{10+11}$ composed of a biconcave lens $L_{10}$ and a biconvex lens $L_{11}$, a positive meniscus lens $L_{12}$ having a concave surface disposed on the object, a biconvex lens $L_{13}$, a negative meniscus lens $L_{14}$ having a convex surface disposed on the object side, a biconvex lens $L_{15}$, and a biconvex lens $L_{16}$. The lens elements $L_{17}$ and $L_{18}$ are employed as a prism P, and an aperture stop S is interposed between the lens elements $L_9$ and $L_{10}$.

The numeric particulars of this lens construction are given below.

| m | r | d | $n_e$ | $v_d$ |
| --- | --- | --- | --- | --- |
| 1 | 121.106 | 3.5 | 1.77620 | 49.6 |
| 2 | 51.885 | 14.5 | | |
| 3 | 314.112 | 10.5 | 1.48915 | 70.2 |
| 4 | −123.225 | 0.2 | | |
| 5 | 119.817 | 2.4 | 1.82548 | 45.3 |
| 6 | 37.299 | Variable | | |
| 7 | 37.044 | 16.5 | 1.59667 | 35.3 |
| 8 | −198.975 | 0.3 | | |
| 9 | 66.664 | 2.1 | 1.88814 | 40.8 |
| 10 | 25.949 | 6.5 | | |
| 11 | 65.131 | 10.5 | 1.81264 | 25.4 |
| 12 | −41.500 | 2.1 | 1.88814 | 40.8 |
| 13 | 56.384 | Variable | | |
| 14 | −174.913 | 2.0 | 1.72309 | 49.1 |

-continued

| | | | | |
|---|---|---|---|---|
| 15 | 37.755 | 11.0 | 1.72310 | 29.5 |
| 16 | 271.341 | 12.2 | | |
| 17 | −133.844 | 3.1 | 1.81264 | 25.4 |
| 18 | 103.876 | 25.0 | 1.53430 | 48.9 |
| 19 | −66.920 | 3.5 | | |
| 20 | −583.432 | 6.7 | 1.48915 | 70.2 |
| 21 | −175.412 | 0.3 | | |
| 22 | 89.254 | 12.2 | 1.49845 | 81.6 |
| 23 | −129.836 | 0.3 | | |
| 24 | 82.896 | 2.9 | 1.83931 | 37.2 |
| 25 | 45.162 | 2.4 | | |
| 26 | 48.245 | 13.5 | 1.49845 | 81.6 |
| 27 | −317.163 | 0.2 | | |
| 28 | 73.299 | 9.0 | 1.49845 | 81.6 |
| 29 | −4153.700 | 2.0 | | |
| 30 | ∞ | 50.5 | 1.69979 | 55.4 |
| 31 | ∞ | 18.5 | 1.51872 | 64.0 |
| 32 | ∞ | 16.1 | | |

Focal length f = 13.3 mm
Field angle = 63.2°
F = 1.2

| Object distance | ∞ | 450 mm |
|---|---|---|
| $d_6$ | 4.00 | 5.25 |
| $d_{13}$ | 47.98 | 46.21 |
| Bf | 59.98 | 60.51 |

$\phi_2/\phi_{1,2} = 0.0041$
$R_2/R_1 = 0.99$

Figure 15A:
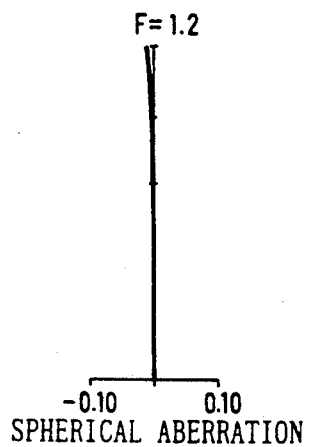
FIGS. 15(a) to 15(c) are diagrams of aberrations at the time of infinite distance focusing by the fourth embodiment of the invention.
Figure 15B:
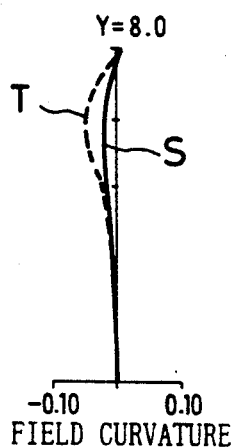
Figure 15C:
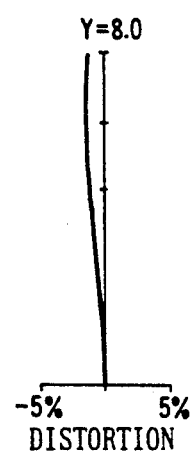
Figure 16A:
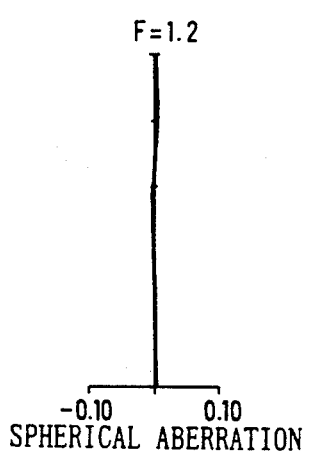
FIGS. 16(a) to 16(c) are diagrams of aberrations at the time of near distance focusing by the fourth embodiment of the invention; an FIGS. 17(a) to 17(c) are diagrams of aberrations in near distance focusing, as observed when the whole lens system of the fourth embodiment is shifted forward.
Figure 16B:
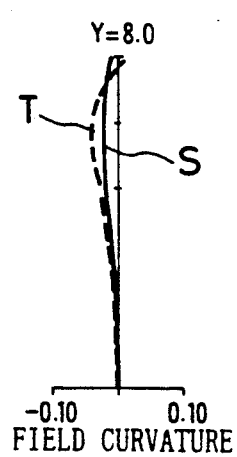
Figure 16C:
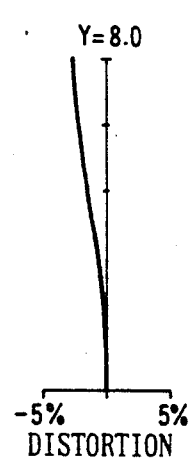
Figure 17A:
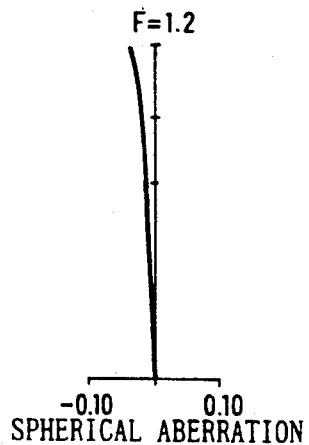
Figure 17B:
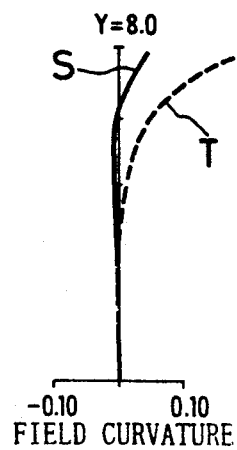
Figure 17C:
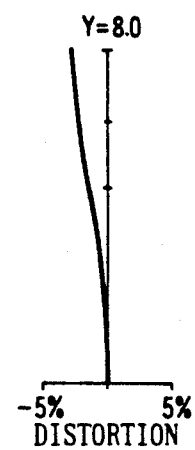

The aberration curves of this lens construction are shown in FIGS. 15 and 16 where the object distance is ∞ and 450 mm, respectively. For the purpose of comparison, FIG. 17 shows similar aberration curves at the object distance of 240 mm, as observed when the whole lens system of the same construction as in the Embodiment 4 is shifted forward for focusing.

As clear from the aberration diagrams of Embodiments 1 to 4, the lens system of the present invention is well corrected for various aberrations including field curvature.

The prism P which is employed for color resolution is not essential to achieve the objectives and effects of the present invention. The stop S is preferred to be located between the lens elements of the rear group $G_3$ from the standpoint of correction of aberrations.

What is claimed is:

1. A retrofocus type wide angle lens system composed of a negative front group $G_{1,2}$ and a positive rear group $G_3$, characterized in that:
   said front group $G_{1,2}$ is constituted by a fixed group $G_1$ starting with a negative meniscus lens having a convex surface on the object side and terminating with a negative lens element having a concave surface on the side of an image-forming plane, and a corrective group $G_2$ starting with a positive lens element having a convex surface on the object side, said fixed group $G_1$ being fixed relative to said image-forming plane while said corrective group $G_2$ and said rear group $G_3$ being movable in the direction of the optical axis to vary the width of the air space between the respective lens groups for focusing purposes.

2. A retrofocus type wide angle lens system as defined in claim 1, wherein said lens system is arranged to satisfy the conditions of $$-0.18 \leq \phi_2/\phi_{1,2} \leq 0.45 \quad (1)$$

$$0.5 \leq R_2/R_1 \leq 1.2 \quad (2)$$

where $\phi_{1,2}$ is the overall refractive power of the composite front group $G_{1,2}$ of said lens system including said fixed group $G_1$ and said corrective group $G_2$, $\phi_2$ is the refractive power of said corrective group $G_2$, and $R_1$ and $R_2$ are the radii of curvature of the final surface of said fixed group $G_1$ of said front group $G_{1,2}$ and the initial surface of said corrective group $G_2$ of said lens system.

3. A retrofocus type wide angle lens system a defined in claim 1, wherein:
   said fixed group $G_1$ in said front group $G_{1,2}$ of said lens system is constituted, when viewed from the object side, by a negative meniscus lens $L_1$ having a convex surface disposed on the object side, a negative meniscus lens $L_2$ having a convex surface disposed on the object side, a biconvex lens $L_3$, and a negative meniscus lens $L_4$ having a convex surface disposed on the object side;
   said corrective group $G_2$ is constituted by a biconvex lens $L_5$ having a strong convex surface disposed on the object side, a negative meniscus lens $L_6$ having a convex surface disposed on the object side, and a cemented lens $L_{7+8}$ composed of a biconvex lens $L_7$ and a biconcave lens $L_8$ and
   said rear group $G_3$ is constituted by a cemented lens $L_{9+10}$ composed of a biconcave lens $L_9$ and a biconvex lens $L_{10}$, a cemented lens $L_{11+12}$ composed of a negative meniscus lens $L_{11}$ having a convex surface disposed on the object and a biconvex lens $L_{12}$, a cemented lens $L_{13+14}$ composed of a positive meniscus lens $L_{13}$ having a concave surface disposed on the object side and a negative meniscus lens $L_{14}$ having a concave surface disposed on the object side, a cemented lens $L_{15+16}$ composed of a biconcave lens $L_{15}$ and a biconvex lens $L_{16}$, a positive meniscus lens $L_{17}$ having a concave surface disposed on the object side, and a biconvex lens $L_{18}$.

4. A retrofocus type wide angle lens system as defined in claim 1, wherein:
   said fixed group $G_1$ in said front group $G_{1,2}$ of said lens system is constituted, when viewed from the object side, by a negative meniscus lens $L_1$ having a convex surface disposed on the object side, a biconvex lens $L_2$, a negative meniscus lens $L_3$ having a convex surface disposed on the object side, and a negative meniscus lens $L_4$ having a convex surface disposed on the object side;
   said corrective group $G_2$ is constituted by a biconvex lens $L_5$ having a strong convex surface disposed on the object side, a negative meniscus lens $L_6$ having a convex surface disposed on the object side, and a cemented lens $L_{7+8}$ composed of a biconvex lens $L_7$ and a biconcave lens $L_8$; and
   said rear group $G_3$ is constituted by a cemented lens $L_{9+10}$ composed of a biconcave lens $L_9$ and a biconvex lens $L_{10}$, a negative meniscus lens $L_{11}$ having a concave surface disposed on the object, a biconvex lens $L_{12}$, a positive meniscus lens $L_{13}$ having a concave surface disposed on the object side, a cemented lens $L_{14+15}$ composed of a negative meniscus lens $L_{14}$ having a convex surface disposed on the object side and a biconvex lens $L_{15}$, a cemented lens $L_{16+17}$ composed of a negative meniscus lens $L_{16}$ having a convex surface disposed on the object side and a biconvex lens $L_{17}$, and a biconvex lens $L_{18}$.

5. A retrofocus type wide angle lens system as defined in claim 1, wherein:

said fixed group $G_1$ in said front group $G_{1,2}$ of said lens system is constituted, when viewed from the object side, by a negative meniscus lens $L_1$ having a convex surface disposed on the object side, a biconvex lens $L_2$, and a negative meniscus lens $L_3$ having a convex surface disposed on the object side;

said corrective group $G_2$ is constituted by a biconvex lens $L_4$, a negative meniscus lens $L_5$ having a convex surface disposed on the object side, and a cemented lens $L_{6+7}$ composed of a biconvex lens $L_6$ and a biconcave lens $L_7$; and said rear group $G_3$ is constituted by a cemented lens $L_{8+9}$ composed of a biconcave lens $L_8$ and a biconvex lens $L_9$, a cemented lens $L_{10+11}$ composed of a biconcave lens $L_{10}$ and a biconvex lens $L_{11}$, a positive meniscus lens $L_{12}$ having a concave surface disposed on the object, a biconvex lens $L_{13}$, a negative meniscus lens $L_{14}$ having a convex surface disposed on the object side, a biconvex lens $L_{15}$, and a biconvex lens $L_{16}$.

6. A retrofocus type wide angle lens system as defined in claim 1, wherein:

said fixed group $G_1$ in said front group $G_{1,2}$ of said lens system is constituted, when viewed from the object side, by a negative meniscus lens $L_1$ having a convex surface disposed on the object side, a biconvex lens $L_2$, and a negative meniscus lens $L_3$ having a convex surface disposed on the object side;

said corrective group $G_2$ is constituted by a biconvex lens $L_4$ having a strong convex surface on the object side, a negative meniscus lens $L_5$ having a convex surface composed of a biconvex lens $L_6$ and a biconcave lens $L_7$; and said rear group $G_3$ is constituted by a cemented lens $L_{8+9}$ composed of a biconcave lens $L_8$ and a positive meniscus lens $L_9$ having a convex surface disposed on the object side, a cemented lens $L_{10+11}$ composed of a biconcave lens $L_{10}$ and a biconvex lens $L_{11}$, a positive meniscus lens $L_{12}$ having a concave surface disposed on the object, a biconvex lens $L_{13}$, a negative meniscus lens $L_{14}$ having a convex surface disposed on the object side, a biconvex lens $L_{15}$, and a biconvex lens $L_{16}$.

7. A retrofocus type wide angle lens system as defined in claim 1, wherein an aperture is interposed between lens elements of said rear group $G_3$.

* * * * *